Nov. 8, 1932.  T. G. STILES  1,886,451
SEAL
Filed July 10, 1931   2 Sheets-Sheet 1
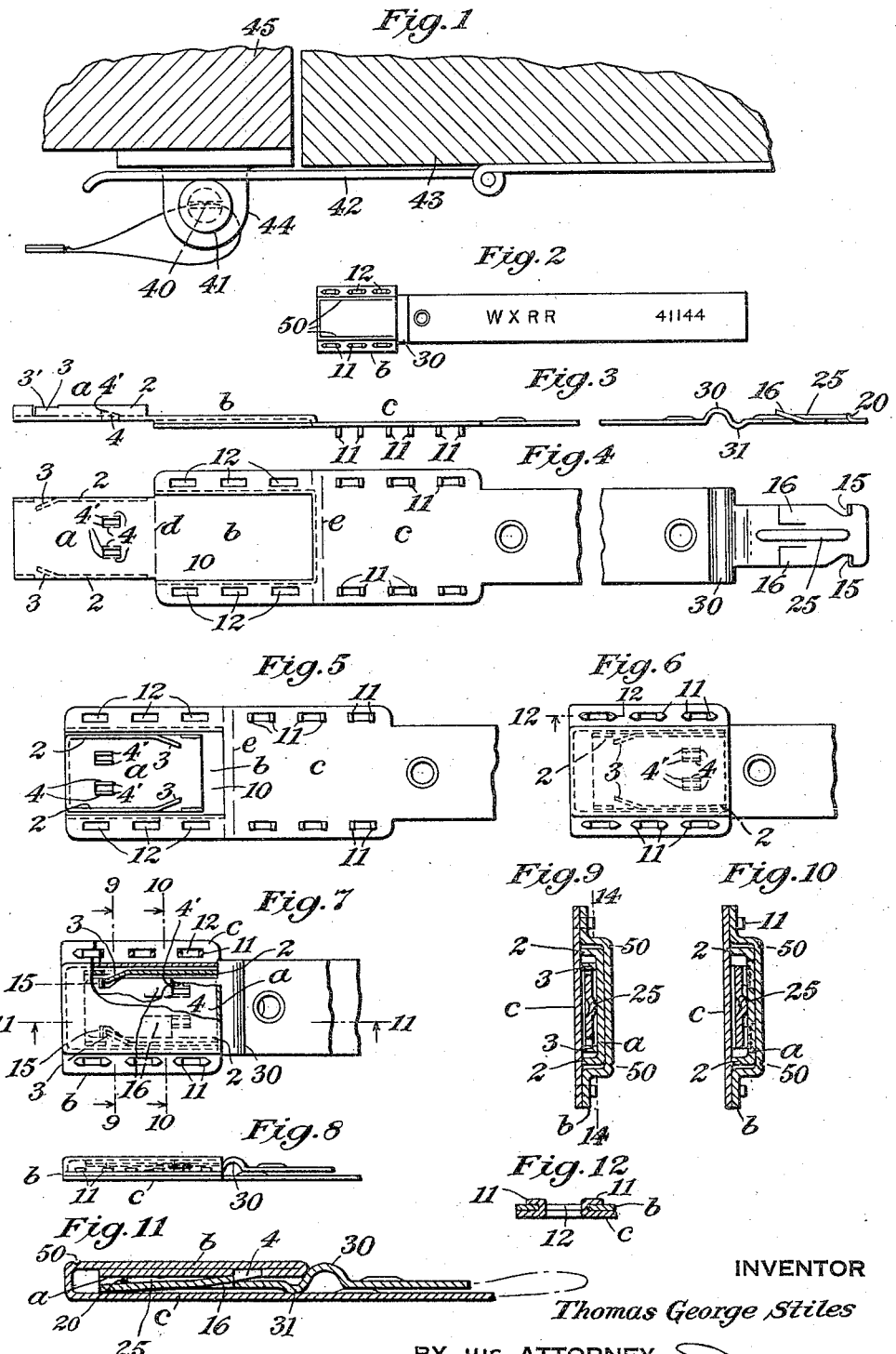
INVENTOR
Thomas George Stiles
BY HIS ATTORNEY Nov. 8, 1932.　　　　T. G. STILES　　　　1,886,451
SEAL
Filed July 10, 1931　　　2 Sheets-Sheet 2
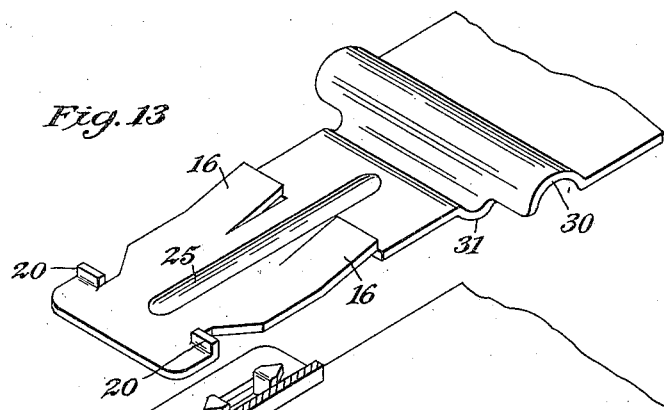
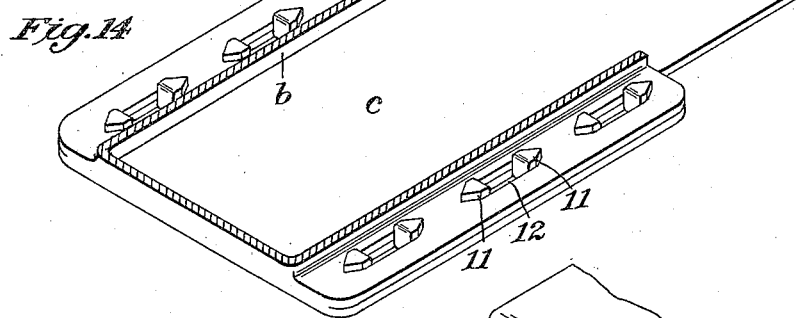
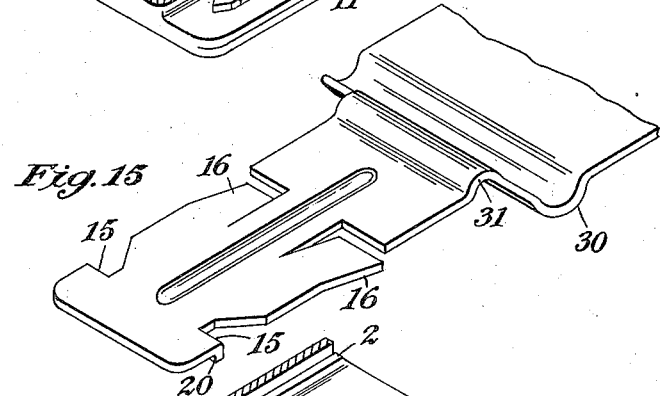
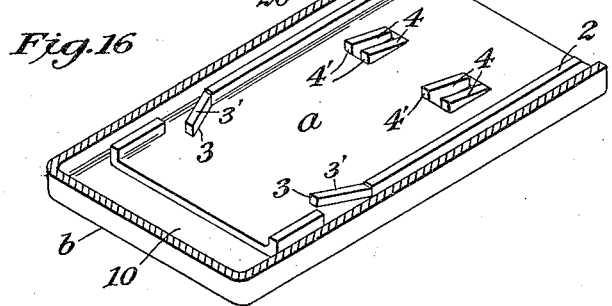
INVENTOR
Thomas George Stiles
BY HIS ATTORNEY Patented Nov. 8, 1932

1,886,451

UNITED STATES PATENT OFFICE

THOMAS GEORGE STILES, OF ARLINGTON, NEW JERSEY, ASSIGNOR TO CONTAINER SEAL COMPANY, INC., OF ARLINGTON, NEW JERSEY, A CORPORATION OF NEW JERSEY

SEAL

Application filed July 10, 1931. Serial No. 549,811.

My invention relates to seal locks or fasteners of the so-called destructible type, comprising interlocking fastening members, preferably formed of light gauge sheet metal, which, after being placed in locking engagement, can only be unlocked by destruction of the seal; the use of these seals being primarily for the purpose of preventing unfastening or tampering with the lock without such fact being apparent.

The present invention has for its object the provision of an improved seal of this type, having means for so housing and guarding the interlocking members of the seal as to effectually prevent manipulation of the same, by means of an extraneous tool or otherwise, in a manner to permit unlocking of the same without destruction of the seal. This object is attained by the novel construction and arrangement of parts comprising the seal as hereinafter described and claimed and as illustrated in the accompanying drawings.

The seal here shown as embodying my invention is adapted for use as a car seal and is in the form of a single metallic strip having at its opposite ends locking members which, when brought into cooperative locking relation, act to secure the seal in closed loop form with its ends locked together; this form of seal permitting of the same being readily placed in connection with the locking pin of the usual type of hasp-lock used for securing freight-car doors, by passing it through the eye or opening in the lower end of the pin and thereafter securing its ends together. It will be understood however that the seal is not limited in its use to any particular kind of container but on the contrary is available for use in sealing closures or containers of any kind.

Referring now to the drawings—

Fig. 1 is a plan view of a hasp-lock applied to the door of a railway freight-car and showing a seal lock embodying my invention connected with the locking pin thereof.

Fig. 2 is a view of a complete seal with the ends thereof in locked engagement, as shown in Fig. 1.

Figs. 3 and 4 are edge and bottom views respectively, on an enlarged scale, of a seal blank, showing the construction of the same as produced by forming dies.

Figs. 5 and 6 are views showing successive operations in forming the housing end of the seal from the blank shown in Figs. 3 and 4, these operations comprising a folding over of the extreme left-hand section of the blank onto the adjacent section, as shown in Fig. 5, and the further folding over of these onto the next section, as shown in Fig. 6, in which latter position the parts are permanently secured to provide a housing in which the opposite or so-called locking end of the strip is adapted to be received and locked when the seal is placed in use.

Fig. 7 is a view of the housing end similar to Fig. 6, but with the locking end of the seal inserted into locking engagement therewith and certain of the parts being broken away and in section to more clearly show the relation of the parts within the housing.

Fig. 8 is an edge view of the construction shown in Fig. 7.

Figs. 9, 10 and 11 are enlarged sections taken on the lines 9—9, 10—10 and 11—11 respectively, of Fig. 7.

Fig. 12 is an enlarged section taken on the line 12—12 of Fig. 6.

Fig. 13 is an enlarged perspective of one side of the locking end of the seal.

Fig. 14 is an enlarged perspective of the housing end of the seal with the upper wall thereof and attached section which carries the locking members, removed on the line 14—14 of Fig. 9; the housing section shown in this figure being adapted to receive the locking end in the position shown in Fig. 13.

Fig. 15 is a perspective of the locking end from the under side, or the side opposite that shown in Fig. 13.

Fig. 16 is a perspective view of the under side of the top part of the housing with its attached locking member section removed from the housing shown in Fig. 14.

As stated, the seal in the form here shown is preferably made up from a single strip of light gauge metal, and as a convenient way of explaining the construction of a finished seal I will describe the general procedure followed in making the same.

As shown in Figs. 3 and 4, a metal strip of desired length is acted upon by suitable dies to provide the same at opposite ends thereof with interlocking members, and to further provide at one end thereof means for housing said members when brought into interlocking engagement.

At the housing end of the strip, which is at the left in Figs. 3 and 4, the same is formed in three sections a, b and c. The outer section a, with the strip in the position shown in Fig. 3, has its longitudinal edges turned upwardly to provide oppositely located flanges 2, 2, from which are cut two inwardly projecting spring tongues 3, 3, while from the body of the strip intermediate of the flanges 2 and back from the tongues 3 are struck up two pairs of lips 4, 4, these tongues 3 and lips 4 forming locking members for interlocking engagement with locking means at the opposite end of the strip in a manner to be hereinafter described. The tongues 3 and lips 4 are so cut from the body of the metal as to have projecting ends facing in the same direction, that is, toward the outer end of the section a, as clearly shown in Figs. 3 and 16.

The section b adjoining the section a is formed with a seat or recess 10 at its under side of a width and depth to receive closely therein the section a, which latter, after being formed as shown in Figs. 3 and 4, is adapted to be bent or folded backwardly, on the line d in Fig. 4, to a position within the said seat 10, as shown in Fig. 5. Thereafter the section b with the folded-in section a, is bent backwardly on the line e in Fig. 5 to a position into contact with the flat surface of the adjoining section c, as shown in Fig. 6, in which position it is secured by means of a series of fastening fingers or rivets 11, struck up from the section c adjacent its opposite edges, entering a series of slots or openings 12 in the adjacent edges of the section b, and having their ends upset into fastening engagement with the adjacent surface of said section, as clearly shown in Figs. 6, 7, 12 and 14.

With the sections b and c thus secured together, they form a housing for the intermediately located section a, as clearly shown in Figs. 9 and 10, which latter section is now positioned with its locking members 3 and 4 on that side thereof directly opposite the section c.

That end of the sealing strip opposite the housing end, which I will refer to for convenience of description as the locking end of the strip, is adapted to be entered into the housing at the open inner end thereof to a position between the sections a and c and is provided with members for interlocking engagement with the tongues 3 and lips 4 on said member a, whereby to effect locking closure of the seal. The locking members on said locking end of the strip, as more clearly shown in Figs. 3 and 4, comprise a pair of shoulders 15, 15 formed by notching the lateral edges of the strip adjacent the end of the latter, and a pair of spring tongues 16, 16 struck up from the body of the metal a short distance back from said shoulders. With this construction, when the locking end is inserted into the housing, it engages the inwardly projecting spring tongues 3, 3 of the section a and deflects these laterally from its path until its shoulders 15 have passed the same, at which time said tongues snap into the notches back of the shoulders and into locking engagement with the latter, as shown in Fig. 7, thus preventing withdrawal of the locking end of the strip from the housing. When the locking end of the strip is being inserted into the housing as described for effecting engagement of its shoulders 15 with the tongues 3 of the housing enclosed section a, its tongues 16 at the same time are being moved over and past the lips 4 on the section a, and yielding to permit of such passage, until they reach a position forward of said lips 4, at which time they snap or spring back into engagement with the ends 4' of said lips 4, these ends 4' of the lips constituting locking shoulders or abutments for engagement by the tongues 16. As a means to facilitate the passage of the tongues 16 over the lips 4, the latter are inclined at their upper edges as shown in Figs. 3 and 16.

The two sets of interlocking members between the opposite ends of the sealing strip thus afford a double protection against breaking of the seal, and this protection is further enhanced by reason of the position of the tongues 16 of the set nearest the mouth of the housing extending from the body of the locking end to a position of contact with the opposite surface of the section a in front of the abutments 4', as clearly shown in Fig. 11, and so serving as a barrier to prevent the insertion of a tool between such parts to a point beyond said tongues 16 where it might be utilized for engagement with the tongues 3 of the innermost set of locking members to disengage them from the shoulders 15, as will be understood by reference to Figs. 6–11.

In order to assure proper cooperation of the locking members and particularly to maintain the tongues 16 in their projected position from the body of the strip, as best shown in Figs. 3, 11 and 13, the locking end of the strip is provided with two projections 20, 20 on the same side thereof with the lips 16, which projections are preferably formed by striking up the metal from the notches forming the shoulders 15. These projections 20, upon the entry of the locking end into the opposite housing end, engage with the opposing surface of the section a and hold said locking end in slightly spaced relation to the latter, whereby the tongues 16 will maintain their projected position for interlocking engagement with the abutments 4' on the section a as shown.

As a means to prevent the tongues 3 being laterally deflected from locking engagement with the shoulders 15 by means of a tool inserted between the locking end and the section c in some unforseen manner, said lips 3 are cut away at their outer longitudinal edges, as at 3' in Figs. 3 and 16, whereby to bring them below the plane of the surface of the locking end when the parts are in locking engagement and so prevent them being engaged by a tool moved laterally across the surface of the locking end next the section c. It will here be understood that the locking end is held in spaced relation to the section a to maintain its under side below that of the cut-away edge of the lips 3 by means of the projections 20 engaging the under side of the section a as above described.

It has been found in the use of these seals that attempts have been made, by means of a tool inserted between the locking end and the section c, to break down the seal between the shoulders 15 in order to contract the strip at such point and thereby bring about the disengagement of the shoulders from the tongues 3. As a means to prevent this I provide an elongated rib or boss 25, preferably struck up from the strip itself at a point between said shoulders and preferably running substantially the length of the locking end, which will engage the adjacent surface of the section a when the seal is closed and so support the strip between said shoulders as to prevent its being bent or broken down at such point in the way referred to. Furthermore, the location of the elongated rib 25 centrally of the strip serves to so limit the lateral movement of any instrument which might be inserted into the housing next the surface a as to render it ineffectual in effecting a disengagement of any of the interlocking members. The rib 25 also serves to stiffen the locking end of the strip and thereby assists in maintaining the locking members in their proper cooperative relation.

As an additional means to prevent tampering with the seal in the way of entering a tool or instrument of any kind into the housing for the purpose of disengaging the locking members, I have provided the locking end of the strip with transversely arranged ribs 30 and 31 at opposite sides thereof in positions adjacent the mouth of the housing when said locking end is inserted into the latter; the upper rib 30, as viewed in Fig. 11, serving as a barrier to prevent entry of an extraneous tool of any kind into the housing from the upper side of the locking end, and the opposite or lower rib 31 engaging the section c to prevent entry of a tool between the parts from the under side of said locking end and at the same time serving to support the latter with the upper rib 30 in its said closing position opposite the mouth of the housing at the upper side of the locking end. In other words, these ribs 30 and 31, formed and positioned as shown and described, serve to effectually plug the mouth of the housing end.

Another and important means for preventing tampering with the seal without such fact being apparent comprises scoring the upper wall of the housing—being the recessed section b—adjacent its edges at the three closed sides thereof, as indicated at 50 in Figs. 2, 9 and 10, which will so weaken the metal on such scored lines as to cause said upper wall to readily break away under the pressure of any instrument inserted beneath the same at the open end of the housing.

With the construction illustrated and described I have provided a seal of cheap and simple construction which is proof against opening or unlocking in any way except by complete destruction of the same.

As hereinbefore stated, the seal in the form here shown is particularly adapted for use as a car seal and is shown in such connection in Fig. 1, in which it is passed through an open- 40 in the lower end of a locking pin 41 which secures the hasp 42 on a car door 43 in locked connection with an eye member 44 on the adjacent car frame 45, in usual manner.

What I claim is:

1. A seal comprising a single metallic strip having a section at one end thereof bent backwardly upon an adjoining second section and the latter being bent backwardly upon an adjoining third section, means uniting said second and third sections at their marginal edges to form a housing enclosing the intermediate first section, which latter is provided with locking abutments adjacent its opposite edges, and the free end of the strip having spring tongues projecting from one side thereof for locking engagement with said abutments and also having a rib or boss intermediate of said tongues for holding the free end in spaced relation to the section carrying said abutments.

2. A seal comprising a single metallic strip having a section at one end thereof bent backwardly upon an adjoining second section and the latter being bent backwardly upon an adjoining third section, means uniting said second and third sections at their marginal edges to form a housing enclosing the intermediate first section, which latter is provided adjacent its opposite edges with two sets of locking members arranged one in advance of the other, and the free end of the strip having at its opposite edges two sets of locking members for locking connection with the said members within the housing and also having a rib or boss extending lengthwise thereof between its said locking members.

3. A seal comprising a single metallic strip having a section at one end thereof bent backwardly upon an adjoining second section and the latter being bent backwardly upon an adjoining third section, means uniting said second and third sections at their marginal edges to form a housing enclosing the intermediate first section, which latter is provided with locking abutments adjacent its opposite edges, and the free end of the strip having spring tongues projecting from one side thereof for locking engagement with said abutments and also having projections on the same side thereof with said tongues for holding the free end in spaced relation to the section carrying said abutments.

4. A seal comprising a single metallic strip having a section at one end thereof bent backwardly upon an adjoining second section and the latter being bent backwardly upon an adjoining third section, means uniting said second and third sections at their marginal edges to form a housing enclosing the intermediate first section, which latter is provided adjacent its opposite edges with two sets of locking members arranged one in advance of the other, and the free end of the strip having at its opposite edges two sets of locking members for locking connection with the said members within the housing and also having transverse ribs at opposite sides thereof for location opposite the open end of the housing when the free end of the strip is inserted into the latter.

5. A seal comprising a single metallic strip having a section at one end thereof bent backwardly upon an adjoining second section and the latter being bent backwardly upon an adjoining third section, means uniting said second and third sections at their marginal edges to form a housing enclosing the intermediate first section, which latter is provided at its opposite edges with inwardly deflected spring tongues and at a point in advance of said tongues with a pair of locking abutments, and the free end of the strip having a pair of shoulders and a pair of tongues for locking engagement respectively with said tongues and abutments within the housing, the said tongues on the free end of the strip being arranged in advance of the tongues on said intermediate section within the housing and serving as barriers to the entry of a tool into the housing beyond the same.

In testimony whereof I affix my signature.

THOMAS GEORGE STILES.